Dec. 28, 1954  P. KORELICH  2,698,401
DIRECT READING RANGE MARK CIRCUIT
Filed Feb. 17, 1951  3 Sheets-Sheet 1

ONE INTERPOLATION TO GIVE RANGE TO TOUCHDOWN

TWO INTERPOLATIONS TO GIVE RANGE TO TOUCHDOWN

PETE KORELICH, INVENTOR.

BY Lyon+Lyon

ATTORNEYS

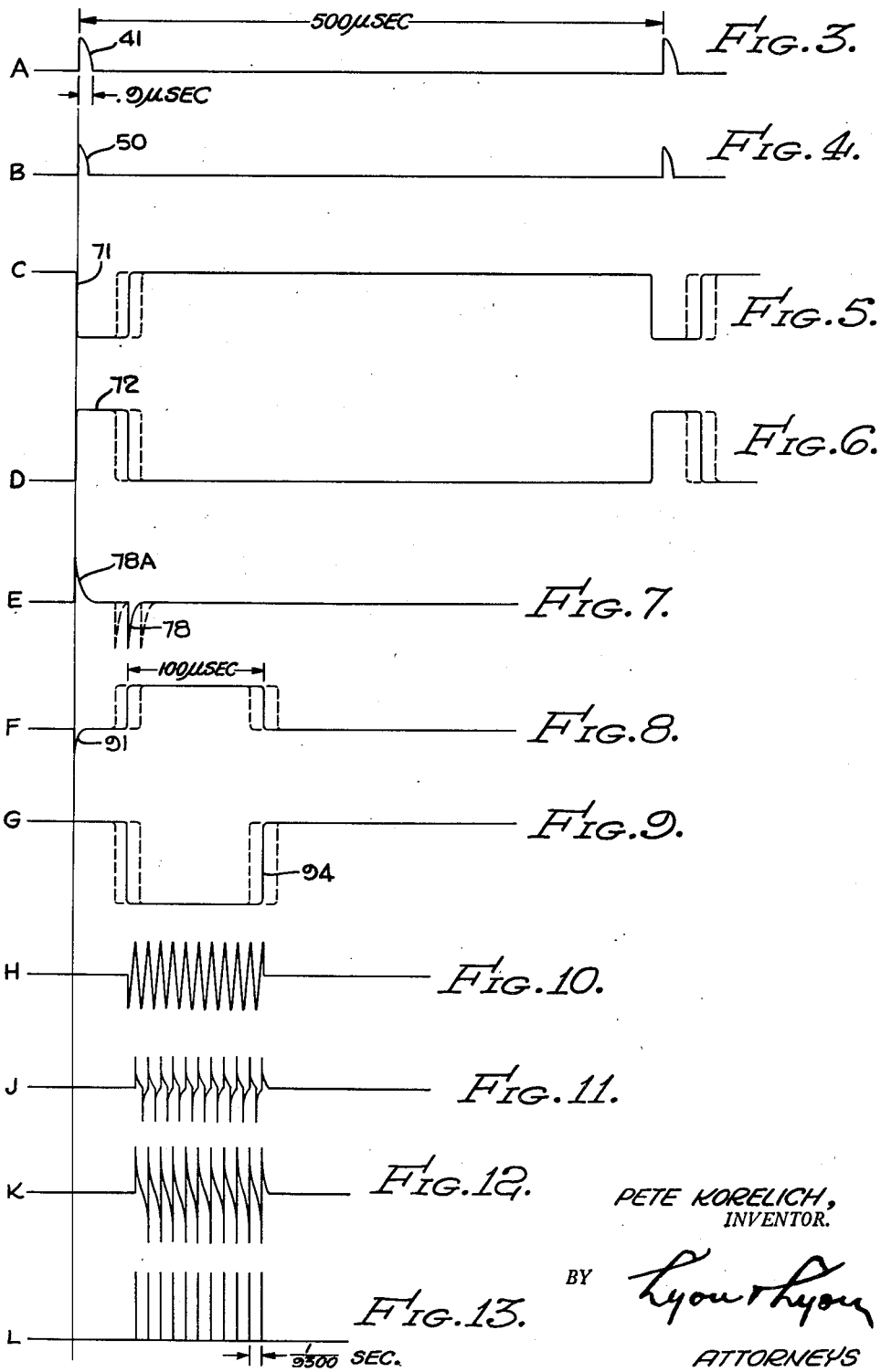

Dec. 28, 1954  P. KORELICH  2,698,401
DIRECT READING RANGE MARK CIRCUIT
Filed Feb. 17, 1951  3 Sheets-Sheet 3

PETE KORELICH,
INVENTOR.

BY Lyon & Lyon
ATTORNEYS

United States Patent Office 2,698,401
Patented Dec. 28, 1954

2,698,401

DIRECT READING RANGE MARK CIRCUIT

Pete Korelich, San Pedro, Calif., assignor to Gilfillan Bros., Inc., Los Angeles, Calif., a corporation of California Application February 17, 1951, Serial No. 211,513

5 Claims. (Cl. 315—22)

The present invention relates to an improved means and technique whereby range markers are generated for use in a radar indication system.

In prior art radar systems, such as, for example, in prior art ground controlled approach (GCA) systems, a range mark generating circuit is usually provided for purposes of calibrating the cathode ray tube presentation. The range markers themselves take the form of a series of very sharp and accurately spaced pulses. These pulses are synchronized with the cathode ray sweep so that when, for example, these markers are impressed on the cathode of the two mile precision indicator tubes in a GCA system, they produce bright spots along the sweep representing definite values of range.

In such prior art systems it is desirable that one of such series of pulses, corresponding to range markers, is made to coincide with a definite established point in the cathode representation to facilitate reading of range on the presentation with reference to such point. Such point in the GCA presentation is the aircraft touchdown point on the aircraft landing field.

Using the prior art range marker circuits, some practical difficulties arise in bringing one of such range markers in coincidence with the aircraft touchdown point on the representation, and usually two interpolations are required to accurately obtain the position of the aircraft either in elevation or in azimuth.

While some adjustment of the prior art range marker circuits allowed the first range marker to coincide with the touchdown point, such adjustment resulted in changing the spacing between the range markers, i. e., the distance represented between different range markers, so that the "scale" of the presentation likewise changed upon adjusting the range marks to obtain such coincidence.

The present invention contemplates the provision of improved means and technique whereby range markers as a group may be shifted with respect to the screen of a cathode ray tube without producing an accompanying change in spacing between such range markers, whereby one of such range markers may be adjusted in position to coincide with an arbitrary point such as the aircraft touchdown point without changing the "scale" of the presentation.

It is therefore an object of the present invention to provide improved means and technique whereby the aforementioned new results are obtained.

Another object of the present invention is to provide improved means and technique whereby a series of very sharp and accurately spaced pulses for producing a corresponding series of range markers may be shifted as a group with respect to the indicating surface of a cathode ray tube without altering the spacing between such pulses or markers in the process of making such adjustment.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

Figure 2:
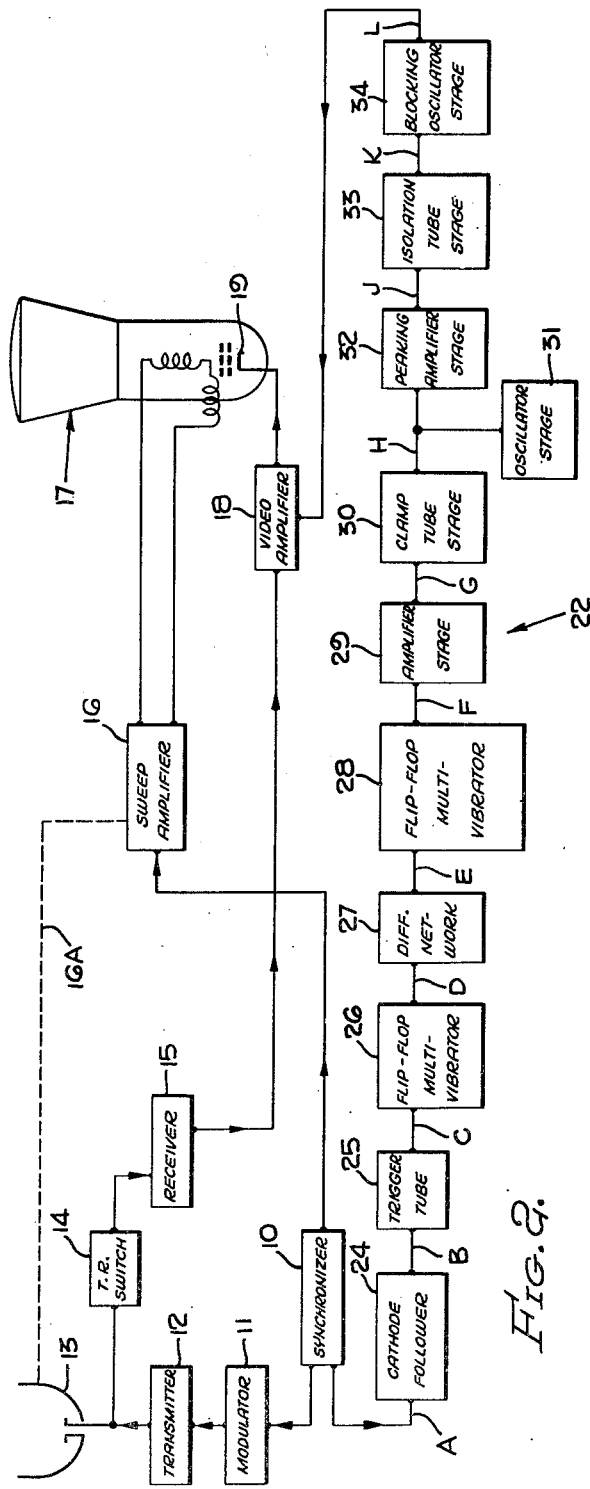
Figure 2 is a block diagram showing a radar system incorporating the present invention and is used to represent generally that apparatus for accomplishing the presentation shown in Figure 1A.
Figure 14:
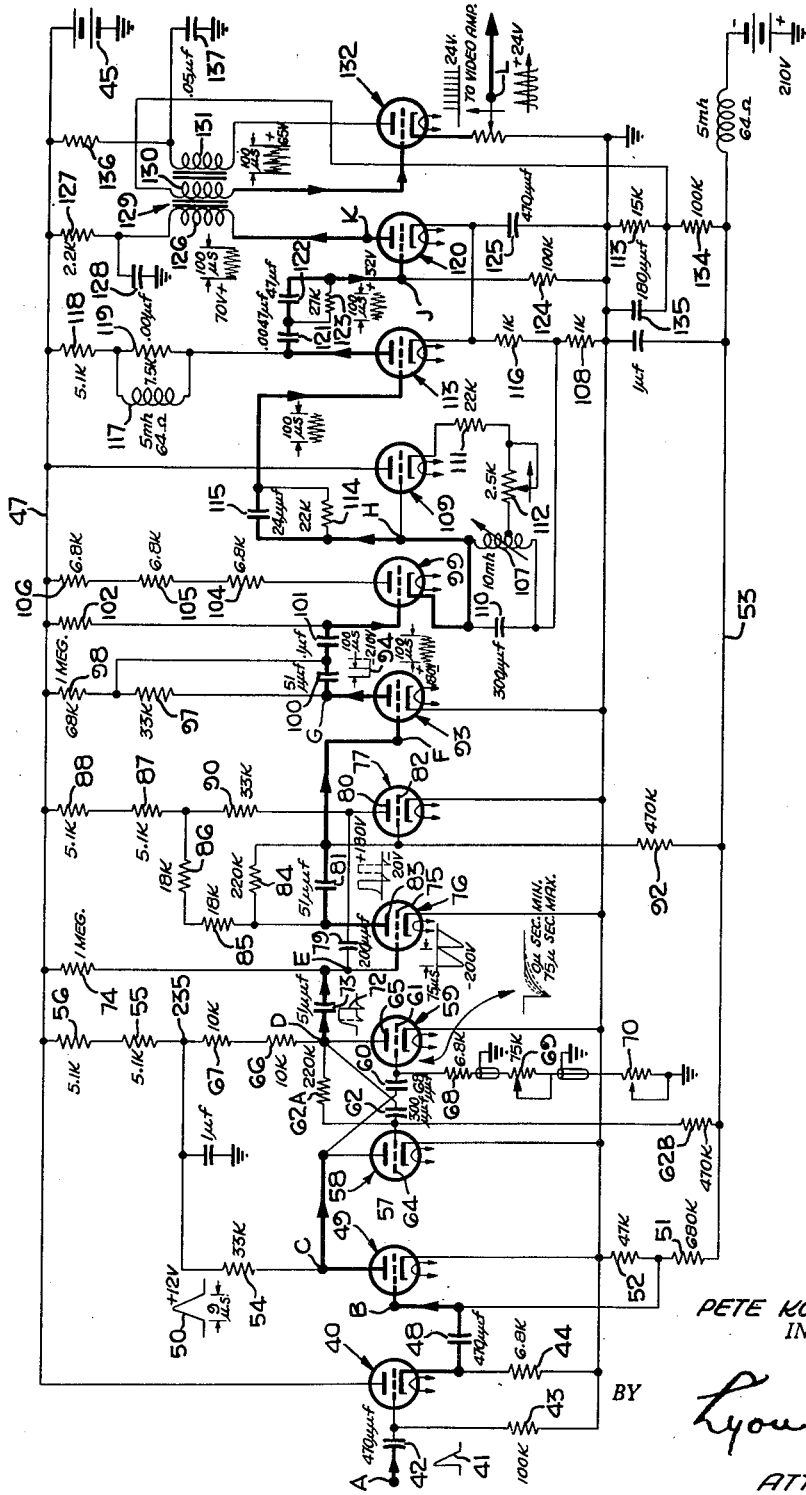

Figures 3–13, both inclusive, show the wave forms appearing at the different terminals A–L, both inclusive, respectively, in Figures 2 and 14;

Figure 14 is a schematic representation of the electrical circuit included between the terminals A and L in Figure 2, with the corresponding terminals in Figures 2 and 14 being designated by the same letter, i. e., reference letter.

Figure 1A:
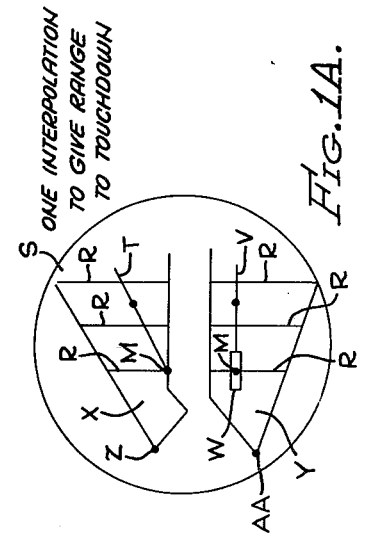
Figure 1A shows a corresponding representation obtained using the present invention.

In accordance with the present invention a new result is obtained as indicated in Figure 1A which represents a presentation obtained on the cathode ray screen S in a GCA system. The inclined line T represents the desired or pretermined glide path in elevation which an aircraft should take in landing to reach the desired touchdown point M on the landing field; and the line V also represents the predetermined glide path in plan, with the small rectangle W in the form of an overlay representing the landing strip itself. Presentations of this type, commonly referred to in the art as Az-El representations (azimuth-elevation representations) of an aircraft in both a vertical and horizontal plane on the same cathode ray screen S, are obtained, as described in the copending patent application of Homer G. Tasker et al., Serial No. 776,702, filed September 29, 1947, for Single Scope Two Coordinate Radar Systems, and assigned to the same assignee as the present invention.

In Figure 1A, the range marks R, in the form of sharply defined generally vertical lines, may be shifted as a group so that one of such range markers R is made to coincide with the touchdown point M on both the elevation display X and on the azimuth display Y. Such coincidence of a range marker R with the touchdown point M is obtained using important features of the present invention without altering the horizontal spacing between such range markers R.

Figure 1:
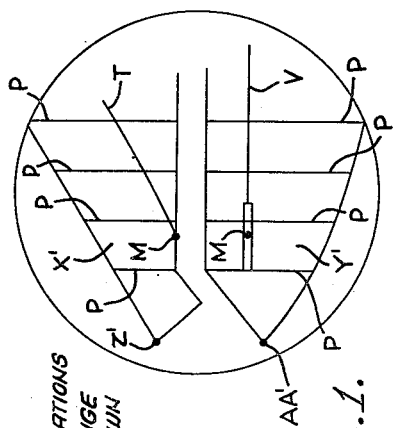
Figure 1 shows, for purposes of emphasizing the new result herein, a cathode ray presentation obtained using the prior techniques.

In obtaining such representations X and Y, all of the cathode ray sweeps originate generally from either the point Z or the point AA, on a time sharing basis, and such sweeps are radial outwardly from such origins Z and AA. Thus the touchdown points M on the displays X and Y may be considered to be arbitrary with respect to the origins Z and AA. In the prior art system, as shown in Figure 1, the range marks P were developed in general by the same trigger or pulse which initiated the travel of the cathode ray sweeps from the origins Z' and AA', whereby the range markers P bear a definite correlation with respect to the distance travelled by the sweeps, while at the same time the touchdown points M on the displays X' and Y', being somewhat arbitrary, have no correlation with respect to the range markers. In such case the touchdown point M lies between range markers and some interpolation is thus required in measuring distances along the predetermined glide paths T and V.

Thus, in accordance with the present invention, as described in greater detail hereinafter, means are provided whereby one of the range markers R is made to coincide with the somewhat arbitrarily chosen touchdown point M, and such adjustment may be obtained over a relatively wide range without altering the horizontal spacing between the markers R.

While the invention is described in relationship to a GCA system, it is apparent, from the description herein, that the apparatus may be incorporated in other types of radar equipment wherein it is desired to provide an adjustable range marker generator for purposes of bringing into coincidence one of the range markers with an arbitrary point on the presentation, and without altering the spacing between the range markers, i. e., scale of the presentation, when in the process of making adjustment in the generator. For that purpose the radar system as shown in Figure 1 is shown in generalized form and includes a central timing and synchronizing unit or synchronizer 10, a modulator 11, a transmitting oscillator or transmitter 12 and an antenna system 13, a transmit-receive switch, i. e., TR switch 14, a receiver 15, an electrical measuring device or indicator which includes a sweep amplifier 16 connected to a cathode ray tube 17 in the manner, for example, described in the aforementioned copending application of Tasker et al., Serial No. 776,702, the video output of the receiver 15 being applied to the input circuit of the video amplifier 18 so as to produce variations in potential of the cathode 19 of the cathode ray tube 17.

In, for example, a GCA system, other voltage wave forms triggered in accordance with pulses developed in the synchronizer 10 are applied to the electrodes of the tube 17 for blanking of the indicator between sweeps. The output of the modulator 11 is applied to the transmitter 12. In general, the timing circuit in the indicator 16, 17 is started at the same instant that the transmitter 12 is pulsed from the modulator 11, so that the elapsed time between the pulses applied from transmitter 12 to antenna 13 and the returning echo from the target may be measured accurately. A synchronous tie 16A exists between the antenna system 13 and the indicator 16, 17. Such synchronous tie 16A may be either electrical or mechanical in nature and may, in fact, be omitted in systems using the A type of indicator.

The modulator 11 is arranged to receive sharp trigger pulses from the synchronizer 10. These trigger pulses start the action of a circuit in the modulator 11 that has a precisely regulated period of operation. This modulator stage 11, often referred to as the transmitter driver, has its output applied to the transmitter 12 in the form of a square wave pulse of short duration. The transmitting oscillator 12 is of conventional type to which are applied pulses from the modulator 11, to thereby effect a series of ultra high frequency oscillations which are fed to the antenna system 13. Energy for the transmittter 12 is conveyed to the antenna system 13 in the form of recurrent pulses, the same antenna system being used also for the reception of the reflected pulses or echoes from a reflecting body or target during the time interval between pulses from the transmitter 12 to the antenna system 13.

The transmit-receive switch 14 serves to block the transfer of high powered pulses in the output circuit of the transmitter 12 from the input circuit of receiver 15. This switch 14 functions as an electronic switching device to block the high powered pulses in the output circuit of the transmitter 12 from the receiver 15 and to allow the relatively weak echo signals received on the antenna system 13 to pass through to the receiver circuit.

Also, the synchronizer 10 has one of its output terminals connected to the range marker generator designated by the general reference numeral 22. The output of the range marker generator, constituting a series of sharp, accurately spaced pulses, is applied likewise to the video amplifier 18 also for varying the potential of the cathode 19 in the same direction as accomplished by the video signals, i. e., received echoes, delivered to the video amplifier 18 from the receiver 15.

The range marker generator 22 includes the different stages found in block form in Figure 2 and shown in greater detail in Figure 14.

In general, a synchronizing pulse or trigger 10 is transferred to the cathode follower 24, and the output of the cathode follower is transferred to the trigger tube 25, in the form of a tube biased in its quiescent stage, to approximately cutoff. The trigger tube 25, upon the reception of a pulse, causes the flip-flop multivibrator with variable gate width 26 to be operated. The multivibrator 26 is of the monostable type and includes an adjustment whereby the gate produced thereby and instigated originally by the pulse from the synchronizer 10 may be varied in time duration. The variable width gate thus produced in multivibrator stage 26 is applied to the differentiating network 27 to convert the leading and trailing edges of the gate into negative and positive peaks, respectively.

The action of the stages 24, 25 and 26, as described in general hereinbefore, may perhaps be better understood by reference to Figure 3–7, both inclusive, which represent respectively the wave forms appearing at the terminals A–E, both inclusive. Thus, as seen in Figure 3, the positive pulses applied to the cathode follower stage 24 appear with the same polarity and with only slightly diminished amplitude at the terminal B. Such pulses applied to the trigger tube 25 cause negative variable width gates to be produced as shown in Figure 5. These positive variable width gates appearing at terminal D, after passing through the differentiating network 27, appear as two peaked voltages, i. e., one which is positive and which is fixed in time with respect to the original pulse delivered from the synchronizer 10, and a second negative peaked voltage wave which is adjusted to be variable in time with respect to the original pulse from the synchronizer 10. It is this adjustable negative peaked voltage in Figure 7 which is utilized to produce the range markers in the manner described hereinafter. This negative pulse in Figure 7 is used to trigger the flip-flop multivibrator 28 so as to produce a gate voltage of approximately 100 microsecond duration as shown in Figure 8, such gate voltage being adjustable in time as indicated by the dotted lines. The gate thus appearing at terminal F is amplified and inverted in the amplifier stage 29, and then applied to the oscillator clamp or switch tube 30. This clamp tube stage 30 serves as a quenching circuit load for the Hartley oscillator 31 which, in the quiescent period, is prevented from oscillating by virtue of a load imposed on the resonant circuit of the oscillator stage 31. While such negative gating voltage at terminal G is in existence, the oscillator stage 31 is free to oscillate, and oscillations are produced in the manner indicated in Figure 10. These oscillations appear at the terminal H and are applied to the peaking amplifier stage 32. The output at terminal J appears as shown in Figure 11. These sine waves thus peaked as shown in Figure 11 are amplified in the trigger isolation tube stage 33 and appear in amplified form at terminal K, as shown in Figure 12. The peaked waves appearing at terminal K are applied to the blocking oscillator stage 34, the output of which appears at terminal L in the form of positive sharply defined spikes or pulses, and after amplification in the video amplifier 18, which serves to invert the polarity of such peaks, they are applied to the cathode 19 in the form of negative pulses to cause periodic intensification of the cathode ray beam.

The particular circuit for accomplishing the aforementioned results in shown in detail in Figure 14 which will now be described.

The marker generator 22, shown in Figure 2, is shown in detail in Figure 14, and the first stage thereof, i. e., the cathode follower stage 24, includes the tube 40. The control grid of tube 40 is connected to terminal A to receive a 15-volt or greater trigger 41 from the synchronizer and through the coupling condenser 42. This control grid is returned to ground through resistance 43, and its cathode output resistance 44 is connected between the cathode and ground. The anode of device 40 is connected to the high voltage lead 47 which is connected to the positive terminal of voltage source 45. The cathode of device 40 is connected through coupling condenser 48 to the control grid of the tube 49, such control grid corresponding to the terminal B to which is thus applied the positive pulse voltage 50. The control grid of device 49 is connected to an intermediate point on the voltage dividing network comprising the serially connected resistances 51, 52 which are interconnected between the lead 53 of negative voltage and ground, whereby a substantial negative potential is applied to such control grid, it being noted that the cathode of device 49 is connected directly to ground. The anode of device 49 is connected through the load resistance 54 and the coupling resistances 55, 56 to the positive lead 47, whereby space current may flow through device 49, such space current, however, in the quiescent stage, being of very small magnitude inasmuch as the bias on the control grid of device 49 is such as to approximately cut off the flow of space current therethrough. Thus, since in the quiescent state substantially no space current flows through the resistance 54, the voltage on the anode 57 is relatively high, such anode 57 being connected to the anode of the device 49 and constituting an element of the monostable flip-flop multivibrator stage which comprises the tubes 58 and 59. Tubes 58 and 59 each have their cathodes connected directly to ground and a condenser 60 interconnects the anode 57 of device 58 with the control grid 61 of device 59. Likewise, the condenser 62 interconnects the control grid 64 of device 58 with the anode 65. Resistance 62A is connected in shunt with the condenser 62 and the grid 64 is connected through resistance 62B to the negative lead 53. The anode 65 is connected to the high voltage lead 47 through the serially connected resistances 66, 67, 55, and 56. The control grid 61 is grounded through the fixed resistance 68 and adjustable resistances 69, 70, one of which may be located at a remote location.

The adjustment of these resistances is important in that it affects the time constant of the circuit connected to the control grid 61 to thereby control the width of the gating voltages 71 and 72 which appear respectively at the terminals C and D. The widths of these gating voltages 71, 72 are indicated as being adjustable by the associated dotted lines, and such adjustment is accomplished generally by adjustment of either one of the resistances 69 or 70.

Briefly, the functioning of the multivibrator, including the tubes 58 and 59, is as follows: In the quiescent stage, i. e., in the absence of the trigger voltage 50 at terminal B, the anode 57 is of relatively high magnitude, but the bias on control grid 64 is such that a relatively small space current flows through device 58 under these conditions. At the same time, a relatively large amount of space current flows through device 59. When the trigger voltage 50 is applied to the control grid of device 39, the voltage at terminal C is depressed because of the resulting current flow through resistance 54, to thus initially produce a negative going edge as shown in the voltage wave 71 in Figure 5. Such negative voltage is applied to the condenser 60 to charge the same and to render the control grid 61 more negative. This condition exists until the charge in condenser 60 is dissipated through the controlled discharge path which includes the adjustable resistances 69 and 70. Upon the grid 61 becoming negative, the terminal D becomes more positive and the positive voltage at this point is transferred through condenser 62 to the control grid 64 to tend to increase the current flow through device 58, i. e., to tend to further reduce the voltage at terminal C. After the duration of the pulse 50, which lasts for approximately nine-tenths of one microsecond, the voltages at terminals C and D, as represented by the voltage forms 71 and 72 in Figures 5 and 6, last for a time interval determined by the setting of the resistances 69 and 70. These resistances 69 and 70 are such that the trailing edges of either voltage waves 71, 72 may be displaced a distance corresponding to 75 microseconds. This voltage wave 72 thus appearing at terminal D is differentiated by the differentiating network comprising the condenser 73 and resistance 74, which are serially connected between the anode 65 and the lead 47, with such condenser 73 also interconnecting the anode 65 and the control grid 75 of the flip-flop multivibrator which includes the tubes 76 and 77. In general, as mentioned hereinbefore, the multivibrator 76, 77 is triggered by the second pulse, i. e., the negative adjustable pulse 78 in Figure 7.

The tubes 76, 77 each have their cathodes connected to ground. Condenser 79 interconnects the grid 75 with the anode 80 of device 77; and likewise the condenser 81 interconnects the control grid 82 of device 77 with the anode 83 of device 76. Resistance 84 is connected in shunt with condenser 81. The anode 83 is connected through the serially connected resistances 85, 86, 87 and 88 to the high voltage lead 47, to thereby provide a path for the flow of space current through device 76. Likewise, the anode 80 is connected through resistance 90 to the junction point of resistances 86 and 87 for the flow of space current through tube 77. It is noted that these connections cause, in the quiescent stage, a relatively heavy current flow through the device 76, since the control grid 75 is maintained at a voltage slightly positive by means of resistance 74.

This feature is desirable and of importance since the multivibrator comprising the tubes 76, 77 is rendered rather insensitive to the positive voltage waves, i. e., the voltage wave 78A (Figure 7) appearing at terminal E. In other words, rendering the terminal E more positive than it normally is in the quiescent stage results in a relatively small change in space current flowing through device 76. Such small change, however, results in the small negative peak 91 (Figure 8) at terminal F. When, however, the negative voltage peak 78 appears at terminal E, a relatively large change in space current through device 76 results, i. e., the flow of space current through device 76 is decreased with a result that the potential on anode 83 increases. This increase in voltage is transferred through condenser 81 to the control grid 82 of tube 77, which, in the quiescent state, conducts a relatively small amount of space current inasmuch as the grid 82 is connected to the negative lead 53 through resistance 92. It is noted that the grid 82 is connected in a voltage dividing circuit, i. e., between the junction point of resistance 92 and 84, but since the potential on the anode 83 is relatively small, in the quiescent stage, a relatively high negative voltage appears on the grid 82 to thereby cause a relatively small space current flow through tube 77 under these conditions. When, however, the potential on the anode 83 rises, as mentioned above, in response to the negative voltage peak 78, the condenser 81 is charged positively, the control grid 82 is rendered more positive to cause the voltage on the anode 80 to be lowered; and such change in potential of anode 80 is transferred through condenser 79 to supplement the action of the original negative pulse 78. This condition wherein the grid 82 is rendered more positive continues until the charge imparted to condenser 81 is dissipated. Such charge on condenser 81 is ultimately dissipated manually in the resistance 84 and interconnected network. But this resistance 84 and interconnected network have such magnitudes that a gate of approximately 100 microseconds is produced as indicated in Figure 8. It is noted that this gating voltage shown in Figure 8 in full lines may be shifted along the time base by shifting the position of the negative pulse 78, the starting time position of which is, as mentioned before, adjusted by adjustment of either resistance 69 or 70.

The gating voltages thus present at terminal F are applied to the tube 93, which serves to produce a resulting wave form 94 (Figure 9) at terminal G, the tube 93 serving essentially as an inverter, amplifying and isolation or buffer tube. The control grid of device 93 is connected to the control grid 82, and the cathode of device 93 is connected to ground. The anode of device 93 is connected to the positive lead 47 through the serially connected resistances 97 and 98. The voltage appearing at the anode of device 93 is transferred to the control grid of the clamp or switch tube 99 through the serially connected condensers 100 and 101. The condenser 100 is in parallel with the resistance 97, and the control grid of device 99 is connected to the positive lead 47 through resistance 102, whereby a slightly positive voltage exists on the control grid of device 99. The anode of device 99 is connected to the positive lead 47 through the serially connected resistances 104, 105 and 106. The cathode of device 99 is returned to ground through a current path which includes a frequency determining inductance coil 107 and resistance 108. The coil 107 is a component of the Hartley oscillator stage which includes the tube 109 and which is described in detail hereinafter. The coil 107 is shunted by the frequency determining condenser 110. These aforesaid connections to the elements of tube 99 result in a relatively heavy current flow through the coil 107 in the quiescent state, and such heavy current flow, under this condition, results in a damping and consequent non-oscillating condition of the oscillator tube 109. In other words, the frequency determining elements 107, 110 are effectively short circuited for A. C. conditions by virtue of connections to the switch tube 99. In the absence of such short circuiting effect, the Hartley oscillator, including the tube 109 and frequency determining elements 107 and 110, produces oscillations of the desired frequency, i. e., of a frequency for producing the corresponding spacing of the sharp peaked voltages appearing at terminal L and ultimately applied to the cathode of the indicator tube.

The device 109 has its anode connected directly to the positive lead 47 and its cathode is connected through fixed resistance 111 and serially connected adjustable resistance 112 to an intermediate point on the coil 107. The control grid of device 109 is connected to the cathode of device 99, and such grid being one terminal of the oscillator, is connected to the control grid of the succeeding peaking amplifier tube 113 through the shunt connected resistance 114 and condenser 115. Adjustable resistance 112 affords means for damping the envelope of oscillations such that it is neither increasing nor decreasing in amplitude over the 100 microsecond period but rather remaining relatively constant.

While the resonant frequency of the oscillator stage, including the tube 109, determines the spacing of the range markers on the cathode ray tube, two other conditions are satisfied, namely, the circuit begins oscillating an adjustable time after the cathode ray sweep is begun; also, the oscillations have the proper phase to place the first range marker at the correct position on the sweep trace, i. e., at the aircraft touchdown point. The oscillations in tube 109 are begun when the current through the switch tube 99 is diminished as a result of the negative gating voltage (Figure 9) applied to terminal G.

When the current through tube 99 is thus diminished, the inductance of coil 107 tends to maintain a continued flow of current, and the changed voltage conditions across the coil cause current flow into the condenser 110, with the result that a voltage is built up on this condenser 110. In other words, the sudden cessation of current through tube 99 and coil 107 choke leaves the tuned circuit 107 and 110 free to oscillate and causes it to generate a sine wave having a natural period of oscillation equal to twice the time required for a radar pulse to travel the distance represented by the spacing between range markers.

The oscillations thus appearing at terminal H are applied to the control grid of the peaking amplifier discharge device 113, which has its cathode returned to ground through the serially connected resistances 116 and 108, and which has its anode connected to the positive lead 47 through the peaking coil 117 and resistance 118, the peaking coil 117 being shunted by the resistance 119. The anode of device 113 is coupled to the control grid of the trigger isolation tube 120 through the coupling condenser 121 and shunt connected condenser 122 and resistance 123. These components 117, 119, on the one hand, and 122, 123, on the other hand, are chosen to distort the sine wave, i. e., to peak sine waves, with the result that the waves appear in peaked form at the terminal J. It is noted that the grid of tube 120, i. e., terminal J, is connected to ground through the resistance 124. The cathodes of devices 113 and 120 are interconnected and connected to ground through the condenser 125. The anode of device 120 is connected to the positive terminal 47 through the winding 126 and resistance 127, the junction point of which is grounded through the condenser 128. The winding 126 forms one of the three windings of the blocking oscillator transformer 129, which includes also the windings 130 and 131. The general purpose of the blocking oscillator stage, which includes the transformer 129 and tube 132, is to further sharpen the peaked voltage waves appearing at terminal K, it being noted, with reference to Figures 11 and 12, that while the tube 120 serves as an isolation stage, it also inverts and amplifies the peaked voltage wave appearing at terminal J. Such peaked voltage waves appearing at terminal K, i. e., across the terminals of winding 126, are induced in the winding 130, which has one of its terminals connected to the control grid of tube 132 and the other one of its terminals connected to a negative point on the voltage divider comprising the serially connected resistances 133 and 134, which are connected between ground and the negative terminal 53. The junction point of resistances 133 and 134 is connected to ground through condenser 135. The anode of tube 132 is connected to the positive lead 47 through winding 131, serially connected with resistance 136. The junction point of resistance 136 and winding 131 is connected to ground through condenser 137. The cathode of device 132 is returned to ground through the potentiometer type output resistance 138, the variable tap, i. e., terminal L, of which is connected to the video amplifier. This potentiometer affords output amplitude control.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

I claim:

1. In a system of the character described for producing a series of range markers, each visible on the face of a cathode-ray tube, a source of synchronizing pulses, a first gating voltage generator coupled to said source, adjustable means whereby one of the edges of the gating voltage generated in said generator may be adjusted in time with respect to the synchronizing pulses, a differentiating network coupled to said gating voltage generator for producing a pair of peaked voltages of opposite polarity, one of which corresponds to the adjustable edge of said gating voltage, a second gating voltage generator coupled to said differentiating network and operated in accordance with said one peaked voltage wave supplied thereto, an oscillator stage incorporating a ringing circuit, said oscillator, in its quiescent state, being inoperative to generate oscillations, means coupling said ringing circuit to said second gating voltage generator to render said oscillator stage operative to produce oscillations, a cathode ray tube, and a wave shaping network for developing a series of pulses, each corresponding to one of said oscillations and coupling said oscillator stage to an intensity controlling electrode of said cathode ray tube cathode beam deflecting means, means developing a series of sweeps, each enduring for the duration of said series of pulses whereby all of said series of pulses produce a series of indications, and said adjustable means being effective to shift all of said indications as a group in said display independently of said sweeps.

2. In a system of the character described wherein it is desired to produce a series of range markers, each visible on the face of a cathode-ray tube, the first one of which may be adjusted with reference to a predetermined point on a cathode ray representation without altering the spacing between said range marks while making such adjustment, the improvement which resides in providing means for generating a gating voltage with means incorporated therein for varying the trailing edge of said gating voltage to effect different durations of such gating voltage, means differentiating the leading and trailing edges of said gating voltage to produce a pair of peaked voltages of opposite polarity, means suppressing one of said peaked voltages, means including a second gating voltage generator operated by the other peaked voltage which corresponds to the trailing edge to produce a second gating voltage, means using said second gating voltage to shock excite an oscillating circuit to develop a series of pulses for substantially the duration of the second gating voltage, a cathode-ray tube including an intensity control electrode and beam deflecting means, means applying said series of pulses to said intensity control electrode, means developing a series of sweeps each enduring for the duration of said series of pulses and applying said sweeps to said beam deflecting means for developing a series of indications in accordance with all of said pulses, and said varying means being effective to shift all of said indications as a group independently of said sweeps.

3. In a system of the character described wherein electromagnetic energy is transmitted in timed relationship with pulses developed in said system and wherein a series of range markers, each visible on the face of a cathode-ray tube are produced, a source of said pulses, a square wave voltage generator coupled to said source, and generating square voltage waves in timed relationship with said pulses, means adjusting the width of said square wave voltages, means adjusting the position of one of the edges of said square wave voltage, a differentiating network coupled to said square wave voltage generator and producing a pair of peaked voltages which correspond to the edges of said square wave voltage, a second square wave voltage generator coupled to said differentiating network and operated in timed relationship with the peaked voltage wave corresponding to said one edge of the first mentioned square voltage wave, an oscillator stage normally ineffective to generate oscillations, and means coupling said oscillator stage to said second square wave voltage generator to render said oscillator stage operative for the duration of said second square wave voltage, a cathode-ray tube having an intensity control electrode and beam deflecting means, a wave shaping network coupled to said oscillator stage and being effective to produce a series of range markers each corresponding to one of said oscillations, and to apply said range markers to said intensity control electrode, means developing a series of sweeps, each enduring for the duration of said series of range markers whereby all of said series of range markers produce visible indications on said cathode-ray tube, and said width adjusting means being effective to shift all of said indications as a group independently of said sweeps.

4. In a system of the character described for producing a series of range markers, each visible on the face of the cathode-ray tube, a source of pulses, a timing voltage generator coupled to said source, adjustable means whereby one of the edges of the timing voltage generated in said generator may be adjusted in time with respect to the synchronizing pulses, a gating voltage generator coupled to said timing voltage generator and operated by said one edge of said timing voltage, an oscillator stage, in its quiescent state, being inoperative to generate oscillations, means coupling said oscillator to said gating voltage generator to render said oscillator effective for the duration of the gating voltage developed in said gating voltage generator, a cathode-ray tube having an intensity control electrode and beam deflecting means, a wave shaping network for developing a series of range marker pulses each corresponding to one of said oscillations and coupling said oscillator to said intensity control electrode of said cathode-ray tube, means developing a series of sweeps, each enduring for the duration of said series of range marker pulses for developing a series of indications on said cathode-ray tube in accordance with all of said range marker pulses, and said adjustable means being effective to shift all of said indications as a group independently of said sweeps.

5. In an arrangement of the character described, a cathode-ray tube having an intensity control electrode and cathode beam deflecting means, means developing a series of range marker pulses with a predetermined time spacing between pulses, means applying said range marker pulses to said intensity control electrode, means developing a series of sweep voltages, each enduring for the duration of all of said range marker pulses in a series, means applying said sweep voltages to said beam deflecting means to produce a series of indications in accordance with all of said range marker pulses in a series, and means operating independently of said sweep voltage generating means for shifting all of said indications as a group without altering the time spacing between said indications.

References Cited in the file of this patent

UNITED STATES PATENTS

| Number | Name | Date |
| --- | --- | --- |
| 2,402,916 | Schroeder | June 25, 1946 |
| 2,422,204 | Meacham | June 17, 1947 |
| 2,426,216 | Hight | Aug. 26, 1947 |
| 2,444,036 | Crost | June 29, 1948 |
| 2,449,848 | Hefele | Sept. 21, 1948 |
| 2,455,373 | Lester | Dec. 7, 1948 |
| 2,477,615 | Isbister | Aug. 2, 1949 |
| 2,512,923 | Dippy | June 27, 1950 |
| 2,543,434 | Bryan et al. | Feb. 27, 1951 |
| 2,551,681 | Lawrence, Jr., et al. | May 8, 1951 |
| 2,589,860 | Pike | Mar. 18, 1952 |